:::{.patent-header}
United States Patent [19]

Mohamed

[11] Patent Number: 6,084,413
[45] Date of Patent: Jul. 4, 2000
:::

[54] METHOD AND APPARATUS FOR DETECTING ROCK MOVEMENT

[76] Inventor: Moustafa Abdel Kader Mohamed, 4167 Hollandia Crt., Prince George, British Columbia, Canada, V2N 4K9

[21] Appl. No.: 09/069,478

[22] Filed: Apr. 29, 1998

[51] Int. Cl.[7] .................................................. G01V 3/10
[52] U.S. Cl. ........................................ 324/345; 324/326
[58] Field of Search ........................... 324/345, 239, 324/243

[56] References Cited

U.S. PATENT DOCUMENTS

| | | | |
|---|---|---|---|
| 2,547,407 | 4/1951 | Nelson | 175/183 |
| 4,384,252 | 5/1983 | Kolter | 324/239 |
| 4,546,649 | 10/1985 | Kantor | 73/168 |
| 4,680,961 | 7/1987 | Grauman et al. | 73/170 |
| 4,866,371 | 9/1989 | De | 324/58.5 |
| 4,901,017 | 2/1990 | Zinke | 324/239 |
| 4,906,925 | 3/1990 | Kiminkinen | 324/228 |
| 5,187,723 | 2/1993 | Mueller-Stuercken | 377/6 |
| 5,327,089 | 7/1994 | Ouellette | 324/345 |
| 5,426,363 | 6/1995 | Akagi et al. | 324/239 |
| 5,498,958 | 3/1996 | Tu et al. | 324/207.16 |
| 5,504,428 | 4/1996 | Johnson | 324/243 |
| 5,519,322 | 5/1996 | Pozzi et al. | 324/346 |
| 5,521,583 | 5/1996 | Frahm et al. | 340/572 |
| 5,525,904 | 6/1996 | Hanley et al. | 324/300 |
| 5,552,705 | 9/1996 | Keller | 324/239 |
| 5,574,367 | 11/1996 | Logue | 324/207.26 |

*Primary Examiner*—Christine K. Oda
*Assistant Examiner*—Victor J. Taylor
*Attorney, Agent, or Firm*—Davis and Bujold

[57] ABSTRACT

A method and apparatus for detecting rock movement. The first step involves using at least one electromagnetic induction coil as a sensor. The second step involves monitoring changes in induced electromotive force in the at least one electromagnetic induction coil over a selected time interval. This new approach is based upon changes in magnetic permeability as a result of rock movement in accordance with Faraday's law of electromagnetic induction. When a plurality of these new sensors are used the speed of the rock movement may also be determined.

10 Claims, 3 Drawing Sheets

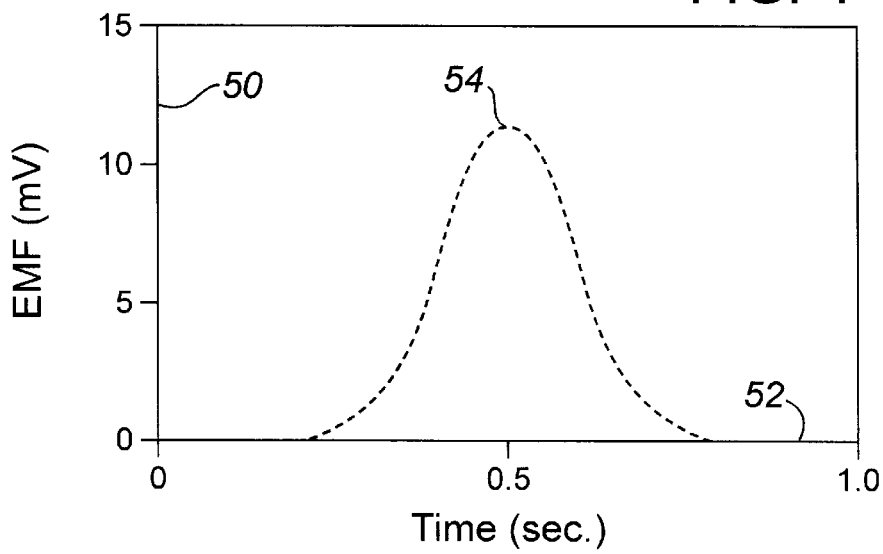

FIG. 4

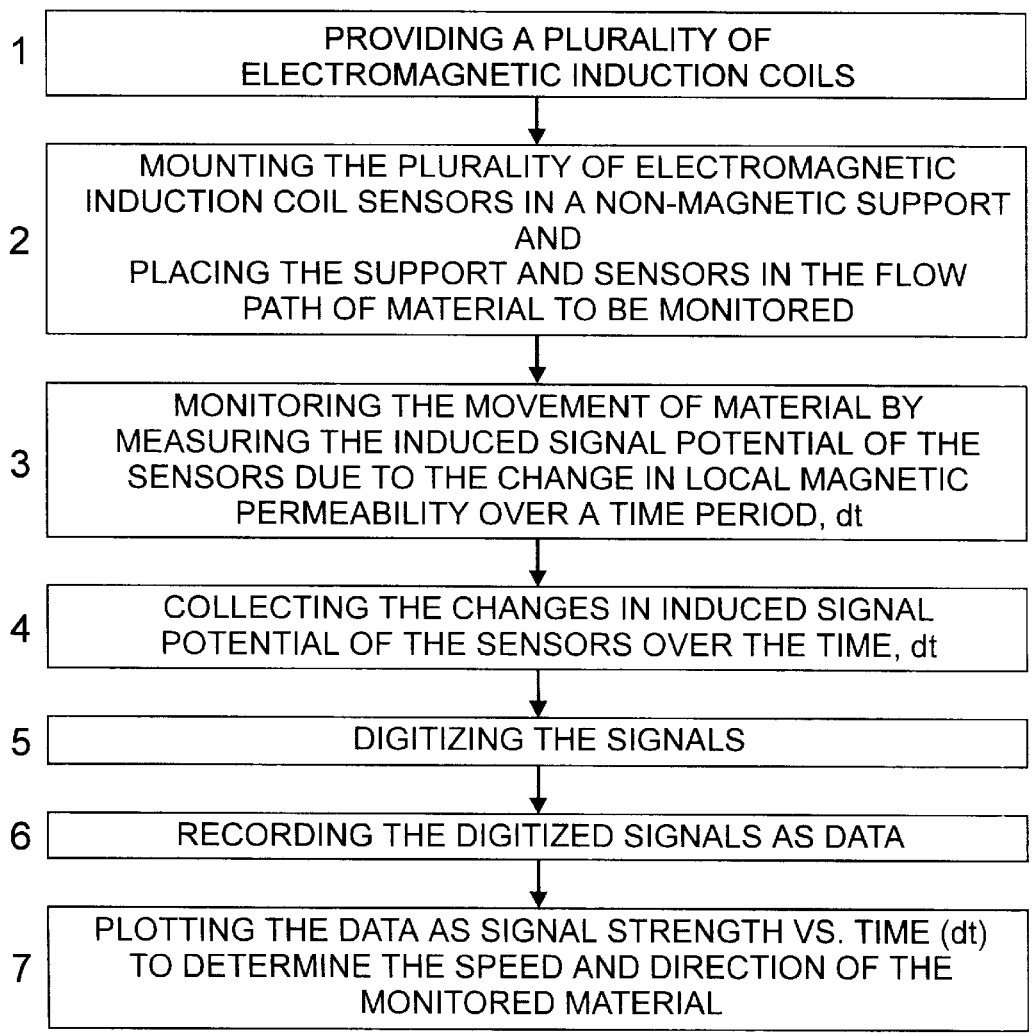

FIG. 5

| 1 | PROVIDING A PLURALITY OF ELECTROMAGNETIC INDUCTION COILS |
|---|---|
| 2 | MOUNTING THE PLURALITY OF ELECTROMAGNETIC INDUCTION COIL SENSORS IN A NON-MAGNETIC SUPPORT AND PLACING THE SUPPORT AND SENSORS IN THE FLOW PATH OF MATERIAL TO BE MONITORED |
| 3 | MONITORING THE MOVEMENT OF MATERIAL BY MEASURING THE INDUCED SIGNAL POTENTIAL OF THE SENSORS DUE TO THE CHANGE IN LOCAL MAGNETIC PERMEABILITY OVER A TIME PERIOD, dt |
| 4 | COLLECTING THE CHANGES IN INDUCED SIGNAL POTENTIAL OF THE SENSORS OVER THE TIME, dt |
| 5 | DIGITIZING THE SIGNALS |
| 6 | RECORDING THE DIGITIZED SIGNALS AS DATA |
| 7 | PLOTTING THE DATA AS SIGNAL STRENGTH VS. TIME (dt) TO DETERMINE THE SPEED AND DIRECTION OF THE MONITORED MATERIAL |

METHOD AND APPARATUS FOR DETECTING ROCK MOVEMENT

FIELD OF THE INVENTION

The present invention relates to a method and an apparatus for detecting rock movement.

BACKGROUND OF THE INVENTION

Scientists have been trying to perfect techniques for collecting data regarding rock movement, such as that which is caused by the flow of water in a river or stream, which is necessary for a thorough study of erosion, flooding, sedimentation and the like. One technique that scientists have employed involves collecting rocks from the site under investigation and implanting a small magnet inside each rock. The rocks are then placed strategically upstream of their anticipated path of travel. After an event of flooding, the new positions of the rocks are traced by detecting the magnet field of the magnets inside each rock. The movement which the rocks have undergone can then be deduced from the changes in the positions of the rocks. One disadvantage of this method is that it is costly to collect rocks, implant a magnet in each rock, strategically place the rocks back at the site under investigation and detect the rocks having magnetic implants after the event. Another disadvantage of this method is that, in adding magnets to the rocks and placing the rocks back into the environment, there is a human intervention that can skew the data received.

A proportion of rocks at any site under investigation have a naturally occurring remnant magnetization that is strong enough to be detected. The signal level which can be obtained using existing technology for detecting the remnant magnetization in a rock that is capable of being detected is approximately 10 microvolts. By working out a statistical average of the percentage of rocks at a site under investigation that are capable of being detected, rough estimates can be made as to the real number of rocks being moved. This method of detection of rock movement requires a considerable amount of study to arrive at a statistical average as to the percentage of rocks at the site under investigation having a remnant magnetism of sufficient strength to generate a signal of magnitude of 10 millivolts. It also requires the use of expensive amplifiers to condition the signals.

SUMMARY OF THE INVENTION

What is required is a method and apparatus that will permit more accurate and less costly detection of rock movement.

According to one aspect of the present invention there is provided a method for detecting rock movement. The first step involves using at least one electromagnetic induction coil as a sensor. The second step involves monitoring changes in induced electromotive force in at least one electromagnetic induction coil over a selected time interval.

This new approach is based upon changes in magnetic permeability in medium proximate to the coil as a result of rock movement in accordance with Faraday's law of electromagnetic induction.

Magnetic induction B is given by $$B = \mu . H$$

where $\mu$ is the magnetic permeability of a given medium and H is the applied magnetic field. The magnetic flux $\Phi$ through one loop of an electrical coil is given by $$\Phi = B.A. \cos \theta$$

where B is as defined above, A is the cross sectional area of the loop, and $\theta$ is the angle between the vector of B and the direction perpendicular to the plane of the loop. As the magnetic flux $\Phi$ changes with time t an electromotive force EMF is generated which is proportional to the product of the rate of change of the magnetic flux and the number of loops in the electrical coil N $$EMF = -N.(d\Phi/dt)$$

The method of detecting rock movement, as described above, based upon induced electromotive force due to the change of magnetic permeability has been found to be much more sensitive to rock movement than the previously described method that relied upon detection of rocks with remnant magnetism. The method detects changes in the magnetic permeability of the medium proximate to the sensor as an object passes close to the sensor. The method is capable of generating signals which are typically between 3 and 10 millivolts as a rock passes by the sensor; which is about 1000 times greater than the signals generated by detecting remnant magnetism.

Although beneficial results may be obtained through the use of the method to determine the existence and extent of the movement of rocks, as described above, it is also desirable to detect the speed of such movement. Even more beneficial results may, therefore, be obtained when a plurality of electromagnetic induction coils are mounted to a non-magnetic support, preferably in rows. By knowing a distance between the rows and a time interval that it took the rock to travel that distance, a calculation can be made as to speed of motion of a rock.

According to another aspect of the present invention, there is provided an apparatus for detecting rock movement which includes a non-magnetic support and at least one electromagnetic induction coil mounted to the support. Means are provided for measuring changes in electromotive force of at least one electromagnetic induction coil. Means are provided for measuring a time interval.

Although beneficial results may be obtained through the use of the apparatus, as described above, in order to determine speed of rock movement a plurality of electromagnetic induction coils must be mounted to the support, preferably in rows.

Although beneficial results may be obtained through the use of the apparatus, as described above, it is preferred that the electromagnetic induction coils be constructed in a manner that increases their sensitivity to rock movement (ie. signal strength) and avoids electromagnetic induction caused by vibration. Even more beneficial results may, therefore, be obtained when the electromagnetic induction coil includes a central magnetic core, a plurality of loops encircling the central magnetic core, with the electromagnetic induction coil being set in epoxy within an iron casing.

Although beneficial results may be obtained through the use of the apparatus for detecting rock movement, as described above, there are some additional features that are beneficial in view of the remote locations at which such apparatus are to be installed. Even more beneficial results may be obtained when means are provided for transmitting data from the remote site to a monitoring station. This enables the data to be sent from the remote site directly to the location where the data will be processed and examined. Even more beneficial results may be obtained when a solar panel is provided to recharge a rechargeable power source that provides power to the apparatus.

BRIEF DESCRIPTION OF THE DRAWINGS

These and other features of the invention will become more apparent from the following description in which reference is made to the appended drawings, wherein:

FIG. 4 is a graphic representation as to how rock movement can be detected with an electromagnetic induction coil by detecting changes in magnetic permeability as a rock approaches and then moves away from the apparatus.

FIG. 5 is a block diagram of the method used in detecting and analyzing rock movement.

DETAILED DESCRIPTION OF THE PREFERRED EMBODIMENT

Figure 1:
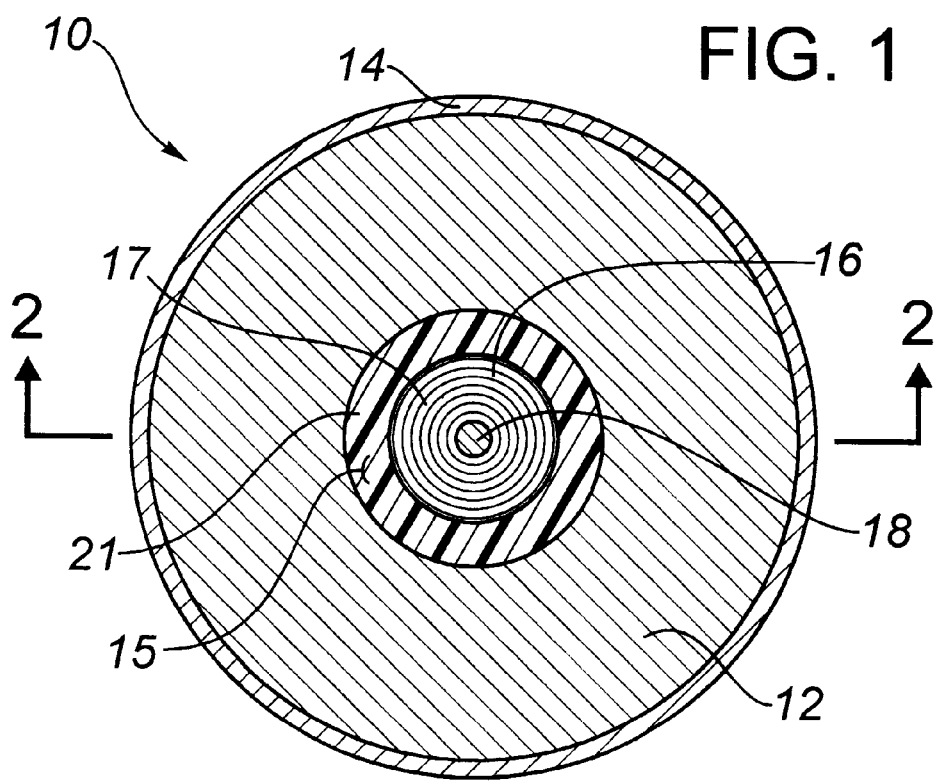
FIG. 1 is a top plan view, in section, of an electromagnetic induction coil sensor constructed in accordance with the teachings of the present invention.

The preferred embodiment, an apparatus for detecting rock movement generally identified by reference numeral 100, will now be described with reference to FIGS. 1 through 4.

With reference to FIG. 1, sensor 10 is constructed of the following components which are assembled in a coaxial configuration. A strong, circular, permanent magnet 12 is fitted within a casing 14 composed of soft iron. Magnet 12 has a circular hole 15 positioned at its centre. In a typical construction, magnet 12 will be approximately 7.5 cm in outer diameter and approximately 1.25 cm deep, with hole 15 approximately 2.5 cm in diameter in the centre. The magnetic field strength of magnetic 12 is approximately 2 kiloGauss at the centre of hole 15.

Coil 16 is placed coaxially within hole 15 in magnet 12. The dimensions of coil 16 will be slightly less than 2.5 cm outer diameter, 0.3 cm inner diameter, and 1.25 cm deep; so as to avoid direct contact between coil 16 and magnet 12. The electrical resistance of such a coil will be approximately 500 ohms and the inductance will be approximately 220 milliHenry. Coil 16 has a plurality of loops 17.

A soft iron core 18 is fitted coaxially within the entire depth of coil 16 and touching the inside surface of the soft iron casing 14 in which the assembly is contained. Iron core 18 is used to increase the magnetic flux at the centre of coil 16, compared to the same assembly with air instead of iron core 18 at the centre of coil 16. It has been found that the presence of iron core 18 increases the magnetic flux at the centre of coil 16 by a three or four fold compared to the magnetic flux at the centre of coil 16 for an otherwise identical assembly in which there is no iron core within the coil. Iron casing 14 also serves to enhance the magnetic flux. The use of soft iron for the construction of casing 14 was found to increase the magnetic flux at the core by approximately two fold when compared with the magnetic flux for apparatus 10 contained within a non-magnetic material. The casing also shields and protects the enclosed components of apparatus 10.

It will be obvious to one skilled in the art that the dimensions or proportions of sensor 10 and of each component therein can be varied to change the electromagnetic properties of sensor 10. The principals of operation are not changed by varying the dimensions.

Figure 2:
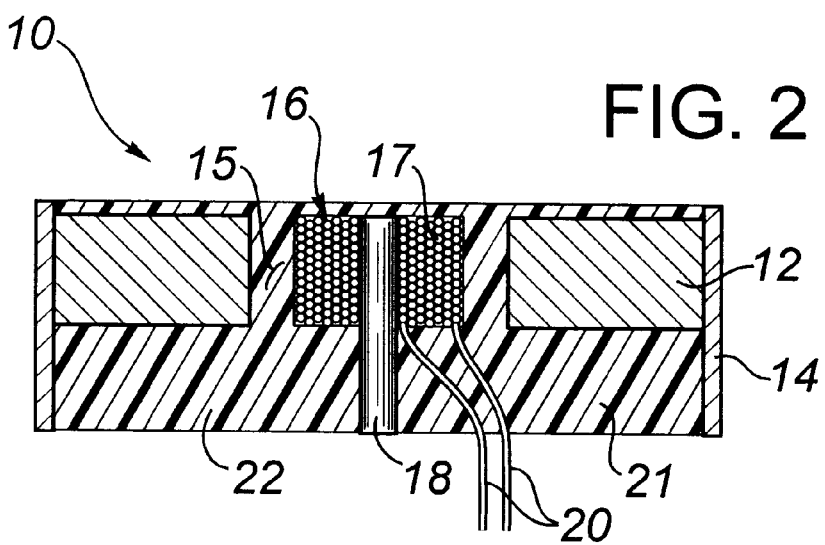
FIG. 2 is a side elevation view, in section, of the electromagnetic induction coil sensor illustrated in FIG. 1.

With reference to FIG. 2, a side view of the assembled magnet 12, soft iron casing 14, coil 16, and soft iron core 18 is shown. Electrical leads 20 are connected to coil 16 and pass through casing 14 to be connected to a data logger or other recording device. The remaining space within the assembly is filled with an epoxy or similar non-magnetic and non-conducting waterproof resin, generally indicated by reference numeral 21. Resin 21 prevents motion of the components within the assembly relative to each other. It is a matter of importance to prevent the motion of the components of the assembly relative to each other. Motion such as that caused by mechanical vibrations can create electromagnetic noise or spurious signals which would adversely affect the detection limits and accuracy of sensor 10 and thereby reduce the quality of the data being collected. Resin 21 also provides the necessary water seal and protection of the components from damage by humidity, water, or impingement by rocks or small particles of solid matter.

Figure 3:
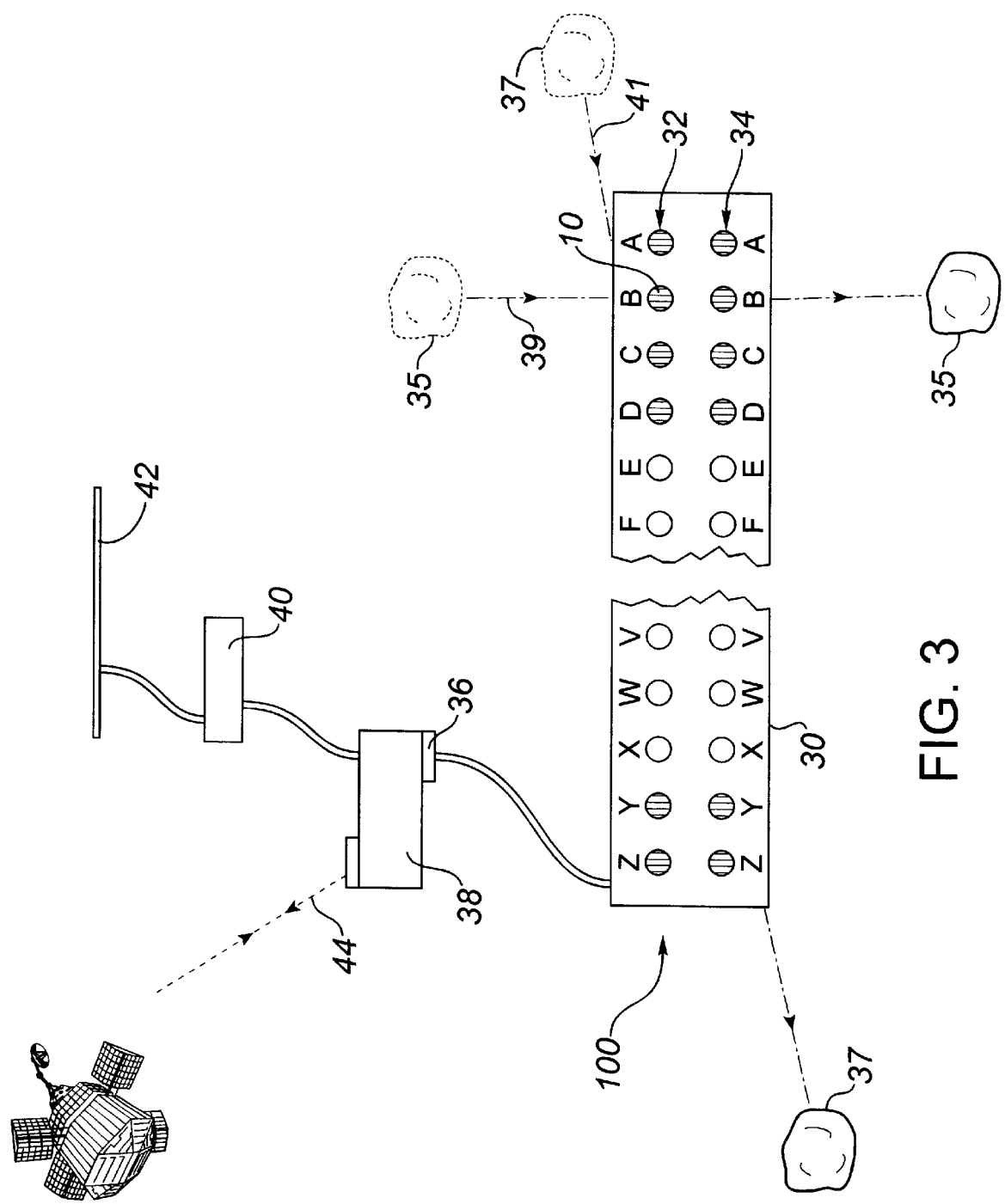
FIG. 3 is a block diagram of an apparatus for detecting rock movement constructed in accordance with the teachings of the present invention.
Figure 1:
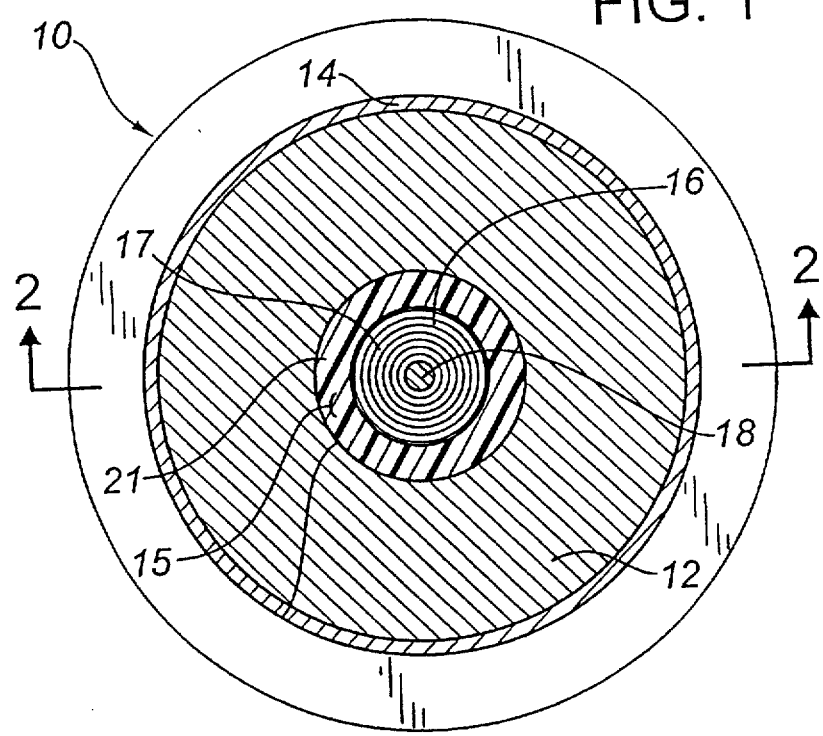
Figure 2:
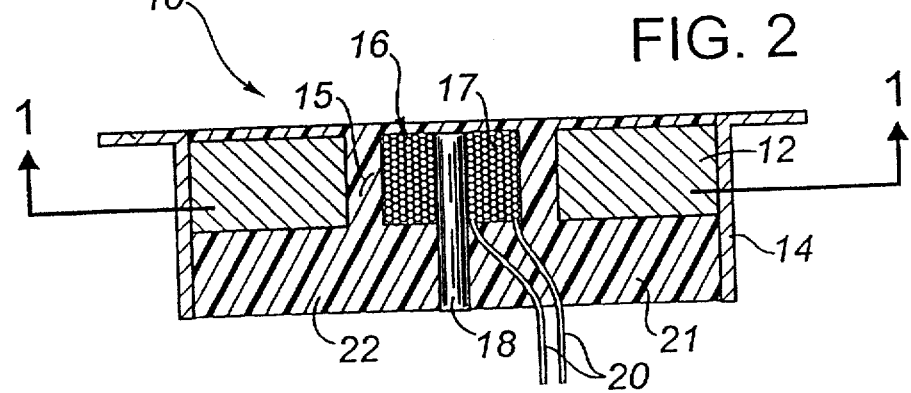

With reference to FIG. 3, a block diagram is shown for one of the possible embodiments of apparatus 100. A plurality of sensor 10 are shown mounted on a support 30 in rows 32 and 34. Each of rows 32 and 34 has sensors 10 a through z. Referring to FIG. 1, each of the electromagnetic induction coil sensors 10 will be as described above, and will include central magnetic core 18, coil 16 with a number of loops 17 encircling central magnetic core 18. Referring to FIG. 3, the length and width of support 30, and consequently the length of rows 32 and 34 will be determined by the width of the flow path at the location at which the array will be used. Support 30 to which sensors 10 are mounted, is constructed from non-magnetic materials. There is consistent spacing between sensors a through z in each of rows 32 and 34. The distance between rows 32 and rows 34 and between sensors a through z within the rows is selected to be larger than the distance which a rock (35 or 37) is expected to be capable of travelling in the interval between measurements. If the expected speed of flow of the water which will cause the rock to move is designated V and the time interval between measurements is designated by dt, then the distance between each of rows 32 and each of rows 34 will be a multiple of the product of V and dt. The value of dt will be determined by the scanning time constant of the signal detection and recording system. The distance between sensors 10 between rows 32 and 34 and between sensors a through z within the rows is selected to allow the collection of sufficient data from across the site under investigation.

Referring to FIGS. 3 and 5, the signals from each sensor 10 will be collected 4 using a data logger 38 coupled to the plurality of electromagnetic induction coil sensors 10. Data logger 38 has processing capabilities and serves as a microprocessor including means for monitoring changes in electromotive force of the electromagnetic induction coil sensors 10 and means for measuring a time interval over which those changes occur. The signals from each sensor 10 are collected through a multiplexer and digitized 5 using an analog to digital converter 36. The digitized signals and the time at which each signal was received will be recorded 6 to data logger 38. The data acquisition, conversion and recording system will be electrically powered. The electrical power may be supplied from an external source or may be supplied from a dedicated source such as a rechargeable battery 40 which can be recharged using a solar panel 42 or other means. The signals may be transmitted to a remote location using a transmission device such as a cellular telephone link 44.

With reference to FIG. 4, as a rock approaches a sensor the magnetic permeability of the medium proximate to the sensor changes. The change in the magnetic permeability is detected as an induced potential 50. As the rock then moves away from the sensor the signal decreases in magnitude. The signal from the detector changes with time 52. The maximum value for the signal 54 shows at what time the rock was closest to the sensor.

The use and operation of apparatus 100 will now be described with reference to the preferred method and with reference to FIGS. 1 through 5. Referring to FIGS. 1 and 5, the first step 1 of the method involves providing a plurality of electromagnetic induction coils, as described above, for use as sensors 10. Referring to FIG. 3, the second step 2 involves mounting the plurality of electromagnetic induction coil sensors 10 in a first rows 32 containing sensors a through z and a second row 34 containing sensors a through z to a non-magnetic support 30. Referring to FIG. 4, the third step 3 involves monitoring changes in induced electromotive force. Referring to FIG. 3 as either of rocks 35 or 37 approach support 30 the magnetic permeability of the medium proximate to sensors a through z in first row 32 and sensors a through z in second row 34 changes. Referring to FIG. 4, the change in the magnetic permeability is detected as an induced potential. The signal from the detector changes with time as rocks 35 and 37 moves toward, past and then away from the sensor. As the rock moves toward the sensor the signal increases, reaches a maximum value as the rock passes the sensor, and then decreases in magnitude as the rock moves away from the sensor. The maximum value for the signal shows at what time the rock was closest to the sensor. Referring to FIG. 3, the speed of movement of the rock can be calculated using data from the sensors 10 in rows 32 and 34 by detecting a change in induced electromotive force in the electromagnetic induction coils over a measured time interval. The signals detected from each sensor are measured in real time. The time at which rocks 35 or 37 is closest to sensors a through z in first row 32 is recorded. The subsequent movement of rocks 35 or 37 will then cause them to travel away from first row 32 of sensors a through z toward second row 34 of sensors a through z. The time at which rocks 35 or 37 is closest to second row 34 of sensors a through z is recorded. Rock 35 is moving at right angles to support 30 along a path indicated by reference numeral 39, which will result in rock 35 moving directly over sensor b in first row 32 and then sensor b in second row 34. The time it took rock 35 to move from sensor b in first row 32 to sensor b in second row 34 can then be calculated. The distance between rows 32 and 34 is known. From the distance between rows of sensors 32 and 34 and the time taken by rock 35 to travel from one to the other the speed of movement of the rock can be calculated. Rock 37, on the other hand is going on an angular path, generally indicated by reference numeral 41, which will take rock 37 in close proximity with numerous sensors starting with sensors a and b in first row 32 and ending with sensors y and z in second row 34. The speed and direction of rock 37 can be determined by plotting the signals 7 for the various sensors along path 41.

The strength of the signal recorded from a sensor 10 is proportional to the change in magnetic permeability in accordance with Faraday's law of electromagnetic induction. The detected signal strength and shape depend upon all of the following factors: the speed, the angle of approach, the distance from the sensor and the internal composition of a given rock. Due to the random nature of all of these factors, each rock will have its own signature signal. This helps in keeping track of a given rock to calculate its speed.

It will be apparent to one skilled in the art that modifications may be made to the illustrated embodiment without departing from the spirit and scope of the invention as hereinafter defined in the claims.

What is claimed is:

1. A method for detecting rock movement, comprising the steps of:

mounting at least one row of electromagnetic induction coils to a non-magnetic support;

positioning the support at a location where rock movement is to be detected; and monitoring changes in electromotive force in the electromagnetic induction coils induced by movement of rocks in the vicinity of the support over a selected time interval.

2. An apparatus for detecting rock movement, comprising:

a non-magnetic support;

at least one row of electromagnetic induction coils mounted to the support;

means for monitoring changes in electromotive force of the electromagnetic induction coils inducted by rocks passing in the vicinity of the support; and means for measuring a time interval.

3. The apparatus as defined in claim 2, wherein the electromagnetic induction coils are arranged in several rows.

4. The apparatus as defined in claim 2, wherein the electromagnetic induction coils each have an annular magnet with a central aperture, positioned in the central aperture are a soft iron core with a plurality of coil loops encircling the soft iron core, the annular magnet, the soft iron core and the coil loops being set in epoxy within an iron casing.

5. The apparatus as defined in claim 2, wherein means are provided for transmitting data to a remote monitoring station.

6. The apparatus as defined in claim 2, wherein a rechargeable power source is provided.

7. The apparatus as defined in claim 6, wherein a solar panel is used as a means of recharging the power source.

8. An apparatus for detecting rock movement, comprising:

an elongate non-magnetic support;

a plurality of electromagnetic induction coil sensors, each of the electromagnetic induction coil sensors including an annular magnet with a central aperture, positioned in the central aperture is a soft iron core with a number of coil loops encircling the soft iron core, the annular magnet, the soft iron core and the coil loops being set in epoxy within an iron casing, the plurality of electromagnetic induction coil sensors being mounted in rows to the non-magnetic support;

a microprocessor coupled to the plurality of electromagnetic induction soil sensors, the microprocessor including means for monitoring changes in electromotive force of the electromagnetic induction coil sensors induced by rocks passing in the vicinity of the support and means for measuring a time interval; and a rechargeable battery providing power to the microprocessor.

9. The apparatus as defined in claim 8, wherein a cellular telephone is provided for transmitting data from the microprocessor to a remote monitoring station.

10. The apparatus as defined in claim 8, wherein a solar panel is used as a means of recharging the battery.

* * * * *

UNITED STATES PATENT AND TRADEMARK OFFICE
CERTIFICATE OF CORRECTION

PATENT NO.    : 6,084,413
DATED         : July 4, 2000
INVENTORS     : Moustafa Abdel Kader MOHAMED It is certified that error appears in the above-identified patent and that said Letters Patent is hereby corrected as shown below:

Figures 1 and 2 of the issued Letters Patent are hereby canceled in favor of corrected figures 1 and 2 attached hereto.

Signed and Sealed this

Twenty-fourth Day of April, 2001

*Attest:*

NICHOLAS P. GODICI

*Attesting Officer*   Acting Director of the United States Patent and Trademark Office